April 15, 1924.   1,490,235
H. R. SMITH ET AL
HANDLING, TRANSPORTING, AND STORING BRICK
Filed Jan. 11, 1921    4 Sheets-Sheet 1
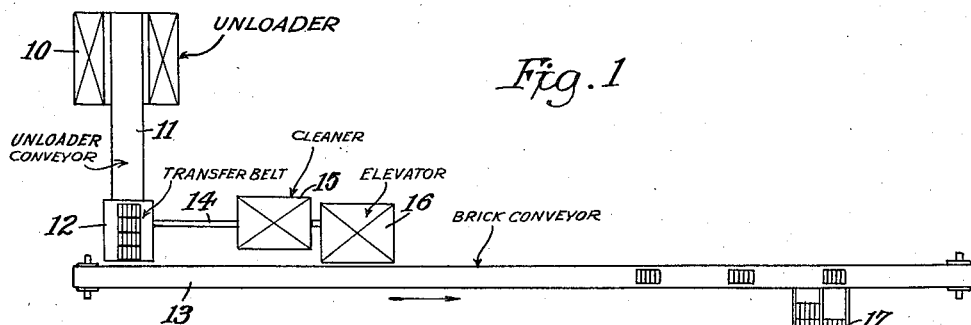
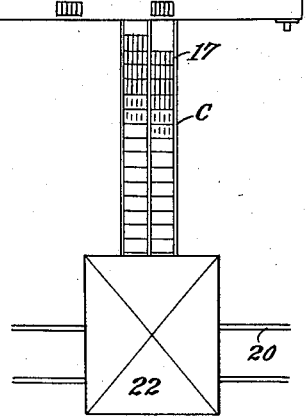
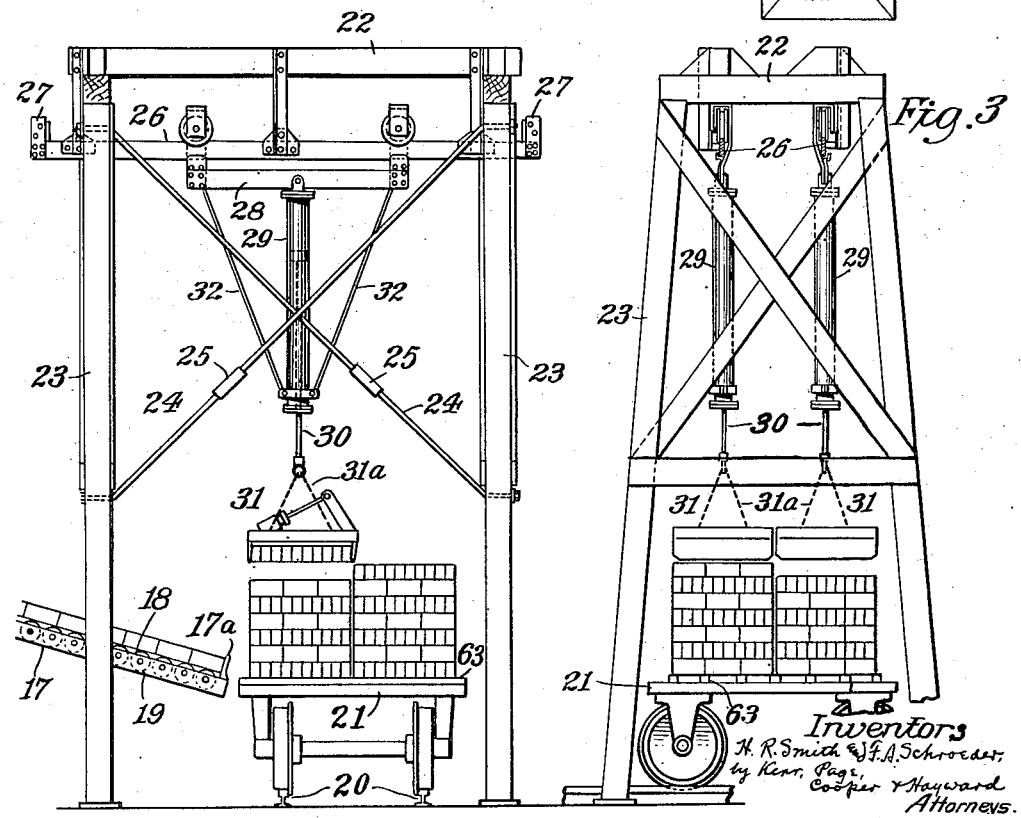

April 15, 1924.

H. R. SMITH ET AL

HANDLING, TRANSPORTING, AND STORING BRICK

Filed Jan. 11, 1921 4 Sheets-Sheet 2

April 15, 1924.
H. R. SMITH ET AL
1,490,235
HANDLING, TRANSPORTING, AND STORING BRICK
Filed Jan. 11, 1921  4 Sheets-Sheet 4
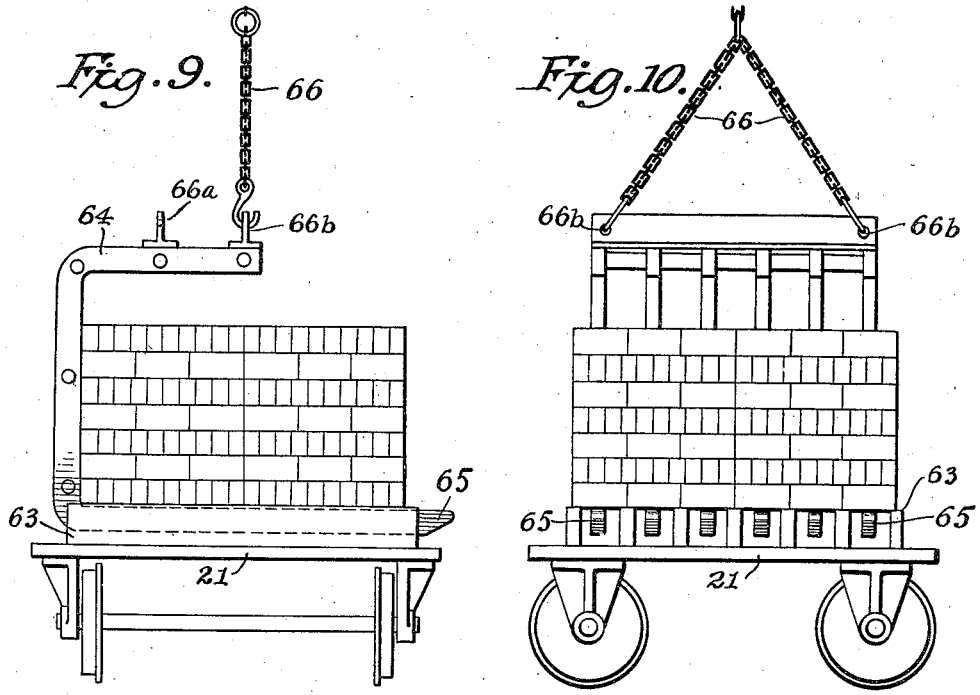
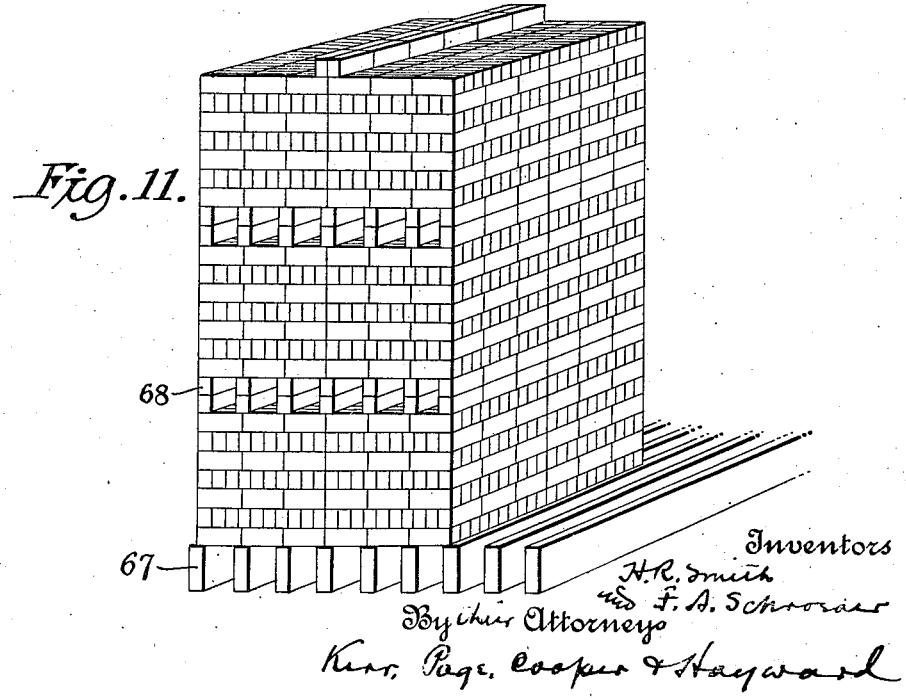

Patented Apr. 15, 1924.

1,490,235

UNITED STATES PATENT OFFICE.

HERMAN R. SMITH, OF BROOKLYN, NEW YORK, AND FREDERICK A. SCHROEDER, OF BOGOTA, NEW JERSEY, ASSIGNORS TO RAYMOND CONCRETE PILE COMPANY, OF NEW YORK, N. Y., A CORPORATION OF NEW JERSEY.

HANDLING, TRANSPORTING, AND STORING BRICK.

Application filed January 11, 1921. Serial No. 436,438.

*To all whom it may concern:*

Be it known that we, HERMAN R. SMITH and FREDERICK A. SCHROEDER, both citizens of the United States of America, residing at Brooklyn, county of Kings, State of New York, and Bogota, county of Bergen, State of New Jersey, respectively, have invented certain new and useful Improvements in Handling, Transporting, and Storing Brick, of which the following is a full, clear, and exact description.

This invention relates to handling, transporting, and storing bricks and the like, and its chief object is to provide simple and effective method and apparatus for the purpose, by the use of which considerable manual labor can be dispensed with, and the remaining manual work rendered markedly less laborious. A further object of the invention is to provide a system of handling bricks and storing them in "unit" groups, piles, or stacks, for the purpose of facilitating subsequent counting and shipping. To this and other ends the invention consists in the novel features hereinafter described.

Convenient and effective devices for carrying out the invention in the preferred manner are illustrated in the accompanying drawings, in which—

Fig. 1 is a diagrammatic plan view illustrating the handling and transporting of the bricks up to and including the loading of the same on trucks for transportation to the yard or other place of storage.

Fig. 2 is a front elevation of the truck-loading apparatus.

Fig. 3 is a side view of the apparatus shown in Fig. 2.

Fig. 9 is a side view illustrating the operation of unloading the truck, and showing also the apparatus used for the purpose.

Fig. 10 is an elevation from the right of Fig. 9.

Fig. 11 is a perspective view showing three truck-loads as stored in the yard.

Figure 4:
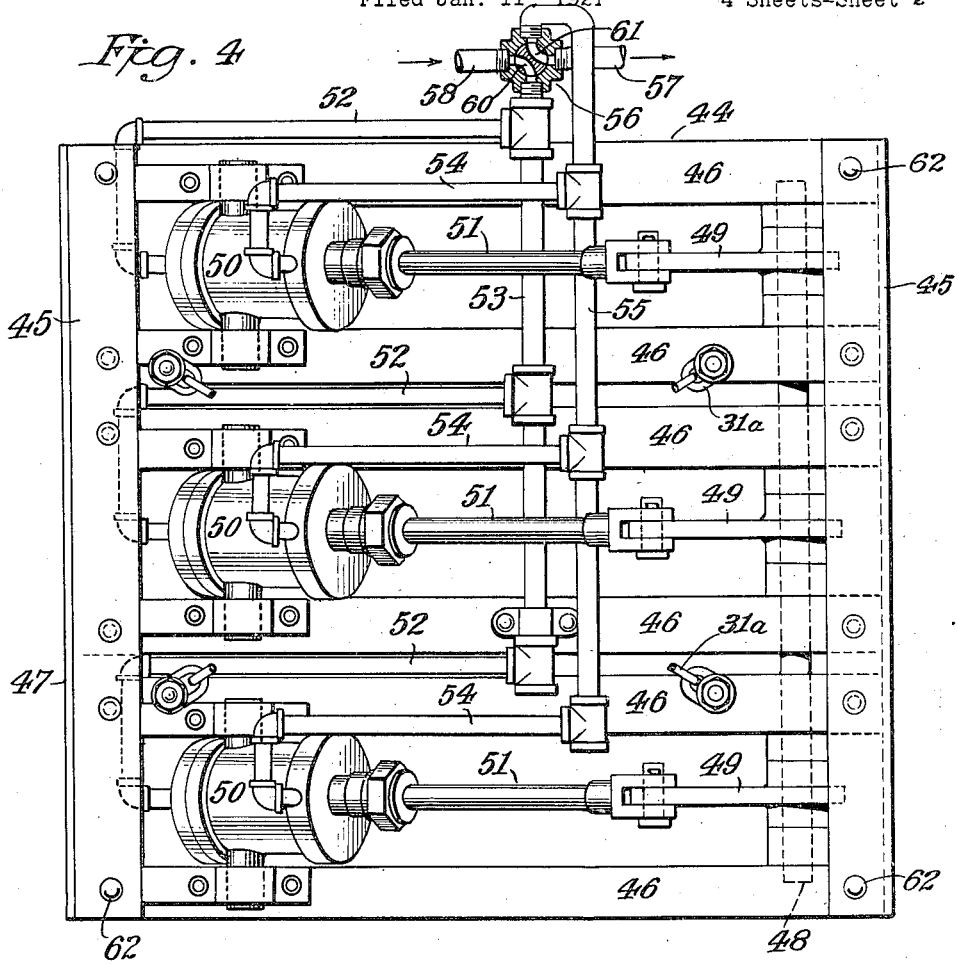
Fig. 4 is a detail plan view of the clamp by which the bricks are lifted from the receiving conveyor and deposited on the truck.

In the system illustrated in Fig. 1, the bricks are brought to the device 10, termed the unloader, standing on edge side by side on pallets, that is, boards or plates of suitable length to hold in the manner described a plurality of bricks, of any suitable number, as for example ten. The brick-laden pallets come to the unloader in horizontal courses, which courses are themselves arranged one above the other but spaced apart, and the same arrangement is preserved in the unloader, to which the pallets are transferred. The unloader is constructed to carry the group of brick-laden pallets intermittently downward, and to deposit at each movement the lowermost course of pallets upon a horizontal conveyor 11, which carries the pallets in succession and discharges the bricks off of the same and upon a transfer belt 12 which in turn delivers the groups of bricks (each group being composed of a pallet-load) upon the brick conveyor 13. The pallets from which the bricks are discharged are carried by a conveyor 14, to a cleaner 15, where they are cleaned and oiled. Thence the pallets pass to an elevator 16 which raises them to a suitable height and delivers them to a gravity conveyor, not shown, which in turn delivers the cleaned pallets to the brick machines, not shown, for re-use. The detailed construction and operation of the apparatus just outlined are fully set forth in our copending application Serial No. 432,680, filed December 23, 1920, to which application reference may be made for further explanation.

The conveyor 13, Fig. 1, carries the bricks in groups (in the present instance ten bricks per group) to a transverse conveyor 17 (see also Fig. 2), which conveyor is preferably of the gravity type, consisting generally of a series of closely spaced rollers 18 journaled in side members of which one is shown at 19. Any suitable means may be provided to deflect the brick groups from conveyor 13 to conveyor 17, or they may be pushed off from one conveyor and upon the other by hand. The conveyor 17 terminates at a point adjacent to a track 20 on which runs the brick truck 21. Over the track and over the adjacent end of the conveyor 17 is an upright frame or skeleton structure 22 composed of spaced end frames 23 connected by diagonal tie rods 24 which may be tightened by means of turnbuckles 25 to give the whole the necessary rigidity.

Suspended from the top of the structure 22 and extending transversely over the conveyor 17 and over the track 20 which defines the path of the truck 21, are two transverse rails 26, extending at both ends a suitable distance beyond the side frames 23, and provided at their ends with stops 27. Mounted to roll on the elevated rails, which are parallel with each other, are two wheeled carriages 28 each provided with means by which one or more groups of bricks delivered by the conveyor 17 may be seized, lifted, carried rightwardly (Fig. 2), and then lowered upon the truck. In the present instance the means provided for the purpose in connection with each carriage is of the fluid-pressure type, and comprises a vertical air cylinder 29 suspended from the carriage and having a piston 30 from which is suspended a brick lifting and carrying device 31. The air cylinders are guyed to the carriages by means of tie rods 32 to prevent swinging.

Figure 5:
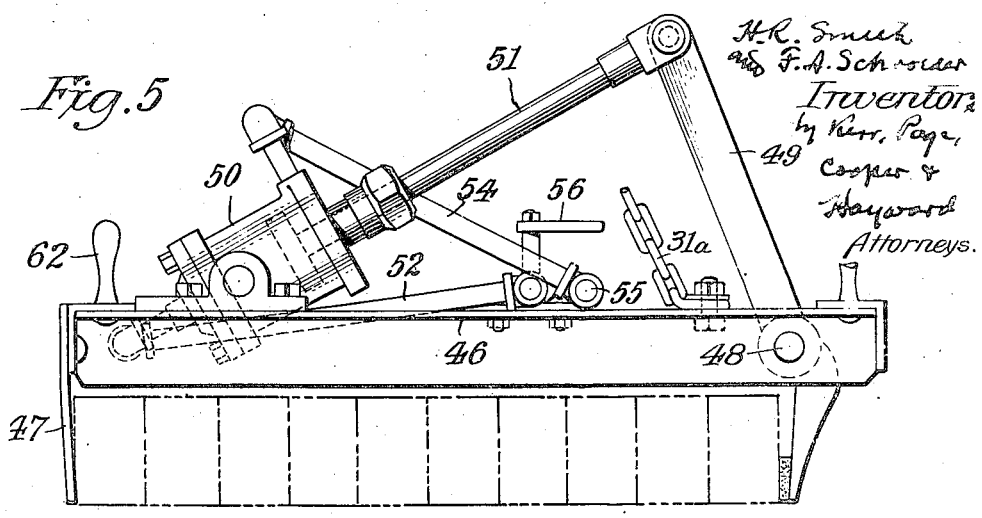
Fig. 5 is a side view of the clamp, as seen from the bottom of Fig. 4.
Figure 6:
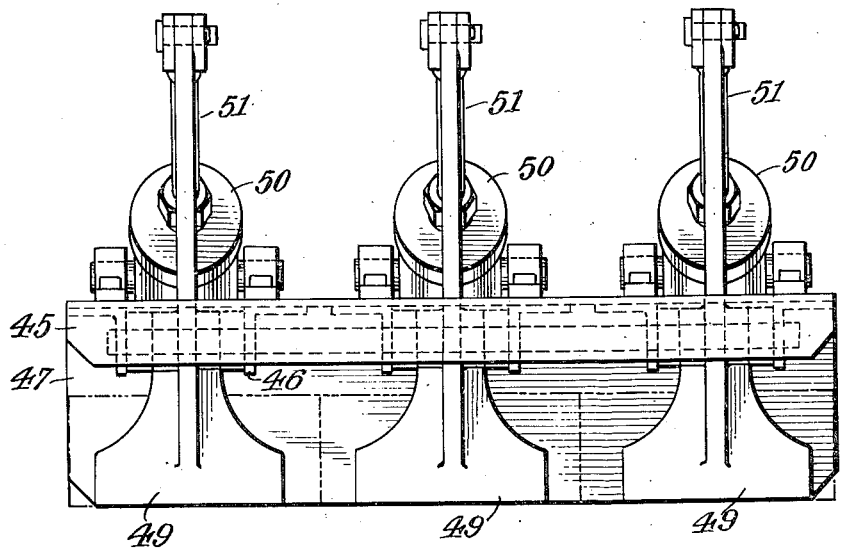
Fig. 6 is an end view of the clamp, as seen from the right of Fig. 4.
Figure 7:
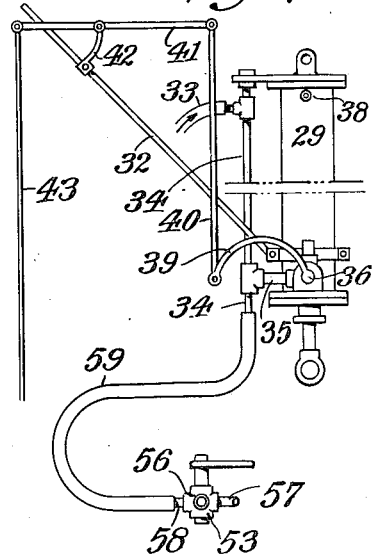
Fig. 7 is a detail view showing the compressed air connections of the clamp and lifting mechanism illustrated in Figs. 2 and 3.

Referring now to Fig. 7, compressed air for actuating the fluid-pressure devices is supplied by a flexible hose 33, which may be taken to represent any suitable source of fluid-pressure. From hose 33 the air is delivered to a vertical pipe 34 and a branch pipe 35 to a valve 36 by which the admission and exhaust of air from below the piston is controlled manually. Valves suitable for this purpose are well known in the art and hence detailed description of the same is deemed unnecessary. At the top of the cylinder, above the uppermost position of the piston, is a vent 38 through which air from the atmosphere flows into the cylinder as the piston descends, and through which air from the cylinder escapes into the atmosphere as the piston rises. For convenient manual operation of the valve 36, it is provided with an operating arm 39 connected at its end by link 40 to a lever 41 fulcrumed on a support 42 which is fixed on one of the guy rods 32. The other arm of lever 41 is provided with a connecting rod 43 which extends downwardly into position for convenient grasp by a workman stationed at the end of the conveyor 17. The lifting and carrying device 31, Figs. 2 and 3, by which one or more groups of bricks on the conveyor 17 are seized and deposited upon the truck 21, is illustrated in detail in Figs. 4, 5 and 6. Referring to these figures, 44 designates a stock in the form of a flat frame of rectangular shape composed of spaced transverse members 45 rigidly connected at right angles to longitudinal members 46. Depending from one of the transverse members 45 is a strong plate 47 forming an abutment and constituting one member of a brick-grasping clamp. Adjacent to the other transverse member 45 is a transverse shaft 48 mounted in the longitudinal members 46 and pivoted on this shaft are three levers 49 the lower arms of which extend below the stock and constitute the movable members of the three clamps. For the purpose of actuating the levers 49, fluid-pressure means are provided, comprising in the present instance air cylinders 50 mounted on trunnions between pairs of longitudinal members so as to be capable of a slight pivotal motion as the aforesaid levers are rocked. The pistons 51 are pivoted to the upper ends of the levers as indicated. Air is admitted to the rear ends of the cylinders through pipes 52 which are connected to a supply manifold 53, and air from the front ends of the cylinders is exhausted through pipes 54 to an exhaust manifold 55. The two manifolds are connected to a valve 56, which has an exhaust outlet 57 and is connected by nipple 58 and flexible hose 59 (Fig. 7) to the compressed air supply pipe 34. As will be readily seen, when the valve 56 is in the position shown in Fig. 4, compressed air will be delivered from nipple 58 through passage 60 to the supply manifold 53 and thence to the several cylinders, so that the pistons will be advanced and the levers 49 rocked clockwise. At the same time, air from in front of the pistons is exhausted through passage 61 and outlet 57. On the other hand, if the valve is given a quarter turn in either direction, the air from the rear of the pistons can escape while compressed air is admitted in front of the pistons, thereby causing the latter to be retracted and rocking the levers 49 counterclockwise.

The three fluid-pressure mechanisms provided for actuation of the movable clamping members 49 operate in unison, but as regards the extent of their movement they are independent of each other, thus accommodating rows (of bricks) which are non-uniform in length due to inequalities in the width of the bricks composing the rows.

The lifting devices 31 are suspended from the pistons 30 by means of chains 31$^a$, as clearly shown in Figs. 2 and 3.

As previously stated, the bricks come down the conveyor 17 and up against the stop 17$^a$ in transverse groups or rows, as indicated in Figs. 1 and 2, preferably with ten bricks in each row or group. To load the truck, which has been wheeled to position under the rails 26, a workman stationed at the end of the conveyor grasps a lifting device by one of its four handles 62 and draws the carriage leftwardly (Fig. 2) to a position over three rows of bricks on the conveyor. He then operates valve 36, Fig. 7, causing the lifter to descend and seat itself over or upon the three selected groups, whereupon he turns valve 56, Fig. 4, to the "on" position. The clamping members 49 are thereby rocked as previously described, causing the same to come up firmly against the ends of the rows of bricks and gripping the same firmly between the clamping members 47 and 49. He then turns valve 36 to the "on" position, which causes the piston 30 to ascend, thereby lifting three rows simultaneously from the conveyor. As soon as the lifting device 31 is raised high enough the workman closes valve 36 and pushes the carriage forward on its rail 26 to a position at which the lifter 31 is directly above the proper place on the truck 21. The piston 30 is now allowed to descend, and when the three rows of bricks have reached the position of rest the valve 56 is turned to "off" position, thereupon releasing the clamps and permitting the now empty lifter to be raised, when the valve 36 is again turned to its "on" position.

In practise two workmen, on opposite sides of the conveyor 17, are employed to operate the two lifting and carrying mechanisms; and it will be understood that the rails 26 are spaced the proper distance apart for building up on the truck two stacks, close together, as indicated in Fig. 3.

Figure 8:
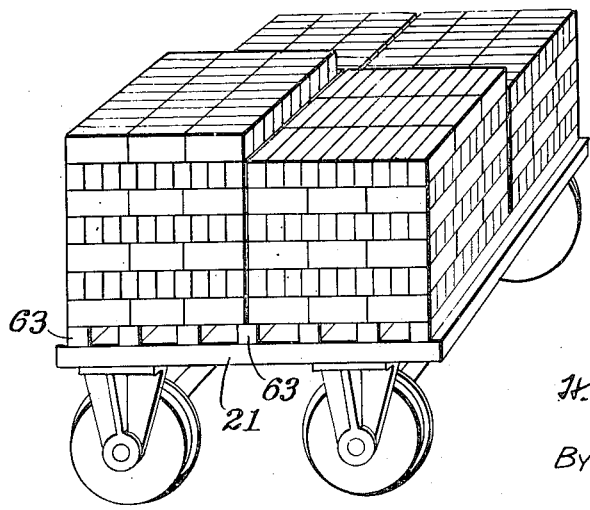
Fig. 8 is a perspective view of the truck with a partial load of bricks thereon.

In the embodiment illustrated herein, the bricks are deposited on the truck in four stacks, forming a pile which is substantially square in plan. The bricks of the lower courses of the four stacks rest at their ends on transverse strips 63, Figs. 2, 3 and 8, and the bricks of the alternate superposed courses are crossed with respect to the courses below on which they rest, as clearly shown in the figures just mentioned. We prefer to have ten bricks in each row, and seven courses of three rows each, in each of the four stacks, a total of eight hundred and forty bricks. When the four stacks are completed, three clamp-loads of thirty bricks each, are deposited on top.

The loaded truck, carrying for example nine hundred and thirty bricks, is now wheeled away to the place where the bricks are to be stored. At this point the entire load is lifted off of the truck by the method illustrated in Figs. 9 and 10. For this purpose a cradle 64 is provided, consisting of six laterally spaced horizontal arms 65, which at their rear are bent upwardly and forwardly to overhang their horizontal lower portions. The cradle is suspended by a cable or fall rope 66 from a suitable crane, not shown. In using the cradle the arms 65 are inserted under the four stacks of bricks on the truck, between the strips 63 as indicated in Figs. 9 and 10. The cradle is then raised, thereby lifting the entire load at one time. At the proper point in the storage yard the cradle is lowered and, if necessary, rotated, to deposit the load upon a series of spaced strips 67, Fig. 11, after which the cradle is retracted. The load being in place, the bricks which were deposited loose on the load are taken by a workman and arranged as indicated at 68 in Fig. 11, that is, seven rows spaced equally apart across the top of the pile, with each row six bricks long and two bricks high. This utilizes eighty-four of the original ninety bricks, the remaining six being laid aside for use later. When the cradle is empty the fall rope 66 is hooked into the ring 66$^a$ instead of 66$^b$ to preserve the balance of the device and maintain the arms 65 horizontal for easy insertion under the bricks on the truck.

The next truck load of bricks is deposited on top of the first load, the spaced rows of bricks on the lower stacks supporting the second load as the strips 67 support the first. A third load, without the extra ninety bricks, is then deposited on the second, as indicated in Fig. 11, and the twelve bricks left over after the intermediate supporting rows are laid, are placed on top of the third load. There is thus produced a unit pile containing twenty-seven hundred bricks, a convenient number for record, cost computation, shipment, etc.

It is to be understood that the invention is not limited to the specific procedure and apparatus herein described, but may be practised in other ways without departure from its spirit.

We claim:

1. A lifting and carrying device for bricks and the like, comprising in combination, a stock, a fixed clamping member mounted on the stock and depending therefrom and a clamping member pivoted on the stock and depending therefrom, and spaced from the first a distance permitting endwise grasp of a row of bricks arranged side by side in contact with each other, and power-operated means carried by the stock above the clamping members for actuating the pivoted member.

2. A lifting and carrying device for bricks and the like, comprising in combination, a stock, a plurality of pairs of relatively movable clamping members mounted on the stock to grasp a plurality of groups of bricks, fluid-pressure operating devices individual to the pairs of clamping members to actuate the same and permit individual variation of movement thereof, and a source of fluid-pressure common to said devices to actuate the same in unison.

3. A lifting and carrying device for bricks and the like, comprising in combination, a stock, a clamp mounted on the stock and comprising a pair of relatively movable members, a fluid-pressure device carried by the stock for actuating said clamp to grasp a plurality of bricks arranged side by side, said fluid-pressure device comprising a cylinder and a piston directly connected to the clamp; and a source of fluid-pressure connected with said cylinder.

4. A lifting and carrying device for bricks and the like, comprising in combination, a stock, a clamp mounted on the stock and comprising a fixed member and a pivoted member, a fluid-pressure device carried by the stock for actuating said clamp to grasp a plurality of bricks arranged side by side, said fluid-pressure device comprising a cylinder pivoted and a piston movable therein and directly connected with the said pivoted member, and a source of fluid-pressure connected with said cylinder.

5. A lifting and carrying device for bricks and the like, comprising in combination, a stock; a plurality of clamps mounted on the stock side by side to grasp a plurality of similarly arranged groups of bricks; and a plurality of fluid-pressure means individual to the movable clamping members to actuate the same in unison, but individually and yieldingly.

6. A lifting and carrying device for bricks and the like, comprising in combination, a stock, a fixed abutment mounted on the stock, a plurality of movable clamping members mounted on the stock side by side, to grasp a plurality of groups of bricks between said members and the abutment, fluid-pressure operating devices individual to the pairs of clamping members to actuate the same and permit individual variation of movement thereof, and a source of fluid-pressure common to said devices to actuate the same in unison.

7. A lifting and carrying device for bricks and the like, comprising in combination, a stock, an abutment depending therefrom, a lever fulcrumed on the stock and having a clamping member extending below the stock, and fluid-pressure means carried by the stock above the abutment and clamping member and connected with said lever to actuate the same.

8. A lifting and carrying device for bricks and the like, comprising in combination, a stock having spaced transverse members and a plurality of laterally spaced longitudinal members connected at their ends to the transverse members, an abutment depending from one of the transverse members, a plurality of clamping levers fulcrumed between longitudinal members near the other transverse member, a plurality of fluid-pressure cylinders, one for each lever, pivoted on and between the corresponding longitudinal members, pistons in the cylinders, connected to the respective levers, and a source of fluid-pressure connected with said cylinders.

9. In combination, a horizontally movable carriage, fluid-pressure lifting mechanism mounted on the carriage, a brick-clamp suspended from said mechanism and adapted to grasp endwise a row of bricks arranged side by side in contact with each other, fluid-pressure means carried by said clamp to actuate the same, a source of fluid-pressure common to said means and mechanism, and manual devices for controlling said means and mechanism independently of each other.

10. In combination, a horizontally movable carriage, fluid-pressure lifting mechanism comprising a cylinder suspended vertically from the carriage and having a vertically movable piston, a brick-clamp suspended from said piston and adapted to grasp endwise a row of bricks arranged side by side in contact with each other, fluid-pressure means carried by said clamp to actuate the same, a source of fluid-pressure common to said means and mechanism, and manual devices for controlling said means and mechanism independently of each other.

11. In a brick handling apparatus, in combination, an upright structure adapted to permit a truck to enter it, a pair of horizontal parallel rails supported by the structure above the path of the truck and extending transversely of said path, a conveyor arranged to deliver bricks in groups to a point under the rails and adjacent to the path of the truck, a pair of wheeled carriages mounted to travel back and forth on the rails, fluid-pressure lifting mechanisms suspended from the carriages, and fluid-pressure brick-lifting and carrying clamps suspended from the lifting mechanisms, adapted to grasp and carry a plurality of groups of bricks on the conveyor and deposit the same upon the truck.

In testimony whereof we hereto affix our signatures.

HERMAN R. SMITH.
FREDERICK A. SCHROEDER.